UNITED STATES PATENT OFFICE 2,650,935

MONOALKYL DINAPHTHYL PHOSPHATE ESTERS

Harry R. Gamrath, St. Louis, and William E. Weesner, Webster Groves, Mo., assignors to Monsanto Chemical Company, St. Louis, Mo., a corporation of Delaware No Drawing. Application April 21, 1949, Serial No. 88,892

8 Claims. (Cl. 260—461)

This invention relates to new esters of orthophosphoric acid; more particularly it relates to certain monoalkyl dinaphthyl phosphate esters of the general formula:

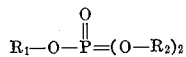

wherein $R_1$ represents an alkyl radical terminating with a $CH_2$ group and containing at least 6 and not more than 18 carbon atoms or a beta-alkoxyethyl radical wherein the alkyl substituent is an alkyl group containing at least 4 and not more than 18 carbon atoms and $R_2$ represents a naphthyl radical.

The monoalkyl dinaphthyl phosphates of this invention have utility as plasticizers and extenders for various synthetic resinous compositions, in particular, compositions containing polyvinyl chloride and polyvinyl chloride copolymers, such as those containing 95 to 85% by weight of vinyl chloride and 5 to 15% by weight of vinyl acetate, vinylidene chloride, diethyl maleate, diethyl fumarate, or methyl methacrylate, imparting to such compositions low volatility losses at high temperatures and excellent fire retardancy. These esters also have utility as film forming addition agents for extreme pressure lubricants and as the liquid medium for filters for air conditioning systems.

The most outstanding utility of these monoalkyl dinaphthyl phophate esters is to be found in the field of functional fluids where they have been found to be particularly useful as synthetic lubricants and force transmission fluids having exceptionally high inherent lubricity.

The novel compounds of this invention are preferably prepared by reacting under controlled conditions a one molecular proportion of a $C_6$ to $C_{18}$ primary aliphatic alcohol or an alkoxyethyl alcohol, wherein the alkyl substituent consists of an alkyl radical having at least 4 and not more than 18 carbon atoms, with a one molecular proportion of $POCl_3$, while continuously removing the HCl formed under vacuum, thereby forming in essentially quantitative yield, the monoalkyl phosphoryl dichloride. This organic phosphoryl dichloride is then added under controlled conditions to substantially two molecular proportions of sodium naphthalate in an aqueous solution. The resultant monoalkyl dinaphthyl phosphate thus formed is separated from the aqueous reaction mass, washed with water and dilute alkali and then dehydrated under vacuum.

In the first step of this process, it is preferred that a substantially one molecular proportion of the aliphatic alcohol be used for each one molecular proportion of $POCl_3$. A slight variation is permissible, but as the molecular proportion of the alcohol is increased beyond the preferred one molecular proportion, the formation of dialkyl phosphoryl chloride is promoted effecting the yield and quality of the final product. If the molecular proportion of the alcohol is reduced below the one molecular proportion, the yield of the finished product is reduced due to the presence of the unreacted $POCl_3$ which must be removed by fractionation to prevent the formation of the triaryl derivative during the subsequent reaction.

The reaction between the alcohol and $POCl_3$ is exothermic and is accomplished by a considerable evolution of hydrogen chloride. The rate of addition of the alcohol and the temperature at which the reaction mass is maintained is, therefore, governed by the nature of the equipment, cooling capacity, and ability to remove hydrogen chloride as it is formed to prevent too violent an action. The practical temperature range limits of this reaction are governed on the one hand by the freezing point of $POCl_3$ and on the other, by the color of the finished product desired. Since $POCl_3$ crystallizes at about 2° C., initial reaction temperatures below 2° C. are not practical. Once the reaction has begun, however, the freezing point of the reaction mass is depressed due to the addition of the alcohol and the formation of monoalkyl phosphoryl dichloride, and the reaction temperature may then be lowered as desired. The reaction temperature is preferably maintained below 25° C. as an upper limit, as higher temperatures in the initial stages of the reaction promote the development of color. Towards the end of the reaction, however, the temperature may be increased to about 50° C. to facilitate the removal of HCl under vacuum.

The concentration of the sodium naphtholate solution is governed by the solubility of the sodium naphtholate at the temperature at which the reaction is carried out. It is preferred that the reaction between the monoalkyl phosphoryl dichloride and the sodium naphtholate solution be carried out at a temperature in the range of from about —10° C. to about 50° C. It is preferred that 2 molecular proportions of sodium naphtholate be used for each one molecular proportion of alkyl phosphoryl dichloride with a maximum of about 5% excess.

The novel esters of this invention, obtained according to the aforementioned procedure, may be refined in accordance with any of the usual procedures of refining phosphate esters well known to those skilled in the art.

The monoalkyl dinaphthyl phosphate esters of this invention may be prepared in the manner illustrated in the following examples:

6-methylheptyl di(α-naphthyl) phosphate 76.7 g. of POCl₃ was cooled with stirring to about 10° C. in a glass lined closed reaction vessel. 65.1 g. of 6-methyl-1-heptanol was cooled to about 10° C. and added to the POCl₃ with continuous stirring and at a rate so as to maintain a reaction temperature of 10° to 14° C. The reaction mixture was continuously agitated and the temperature gradually increased to 25° C. over a period of about one hour. While the stirring was continued, the reaction mixture was placed under a vacuum (below 50 mm. Hg) for another 1–1½ hours to remove the hydrogen chloride gas which was evolved from the reaction. The reaction mixture then contained predominantly 6-methylheptyl phosphoryl dichloride.

An aqueous solution of sodium α-naphtholate, prepared by adding 151.3 g. of α-naphthol to an alkaline solution of 350 ml. of water and 86.1 g. of 48.7% sodium hydroxide, was cooled and the 6-methylheptyl phosphoryl dichloride added to the sodium naphtholate solution over a period of about 2½ hours and at such a rate as to maintain a reaction temperature of from 18°–21° C. The reaction mixture was further stirred for another six hours maintaining alkaline conditions by the addition of an additional 10.1 g. of 48.7% sodium hydroxide. The mixture was then allowed to stand until an ester layer and an aqueous layer formed and the crude ester layer was then separated from the aqueous layer. The crude ester was given successive washes with 2% NaOH solution and water thereby removing the unreacted α-naphthol and partial esters, and reducing the alkalinity of the mass until it was acid to phenolphthalein, and then dehydrated under vacuum at about 100° C. The yield, based on POCl₃, was 75.5%.

The 6-methylheptyl di(α-naphthyl) phosphate prepared in the above manner had the following properties:

Color and appearance __ Dark brown oily liquid.
Sp. gr. 25/25° C. _____ 1.1554.
Viscosity:
   100° F. _____ 557.22 centistokes.
   210° F. _____ 18.4 centistokes.
Pour point _____ +10° F.

The outstanding and unpredictable property of the monoalkyl dinaphthyl phosphates of this invention is their exceptionally high viscosity at elevated temperature as exemplified by the above mentioned physical properties of 6-methylheptyl di(α-naphthyl) phosphate. This unexpected property of the monoalkyl dinaphthyl phosphates when combined with their excellent lubricity, mechanical, chemical and shear stability, and fire retardancy, render them of particular utility as high temperature lubricants. Thus the monoalkyl dinaphthyl phosphate esters of this invention possess an outstanding and unexpected utility that is not to be found in the mixed esters of ortho-phosphoric acid heretofore known.

Liquid triaryl phosphates, such as tricresyl phosphate, and the mixed alkyl aryl phosphate esters disclosed in the art, have been suggested as specialty lubricants in precision instruments. Due to the exceptionally low viscosity characteristics of these materials, their use in such applications has been limited to those wherein the lubricating fluid is subjected to relatively low temperature only. These materials cannot be utilized in high temperature applications as their loss in viscosity at high temperatures increases their fluidity to such an extent that it is practically impossible through ordinary methods of construction to prevent leakage of the lubricating material. The monoalkyl dinaphthyl phosphate esters of this invention, however, possess exceptionally high viscosities at elevated temperatures thereby retaining sufficient body to permit retention in the mechanism being lubricated. The following table clearly illustrates the outstanding and unexpected viscosity characteristics of the novel monoalkyl dinaphthyl phosphates of this invention in comparison with the viscosity characteristics of tricresyl phosphate:

| Compound | Viscosity in Centistokes | |
|---|---|---|
| | 100° F. | 210° F. |
| 6-methylheptyl di(α-naphthyl) phosphate | 557.22 | 18.4 |
| 2-ethylhexyl di(β-naphthyl) phosphate | 167.3 | 9.26 |
| tricresyl phosphate | 40 | 4.0 |

In addition, the monoalkyl dinaphthyl phosphate esters of this invention may be mixed with other lubricants and phosphate esters to produce a wide variety of lubricating compositions. For example, 6-methylheptyl di(α-naphthyl) phosphate may be mixed with tricresyl phosphate to produce a mixture having a viscosity intermediate to that of tricresyl phosphate and 6-methylheptyl di(α-naphthyl) phosphate. In this sense, 6-methylheptyl di(α-naphthyl) phosphate is actually acting as a viscosity modifier for tricresyl phosphate. Thus the novel monoalkyl dinaphthyl phosphate esters of this invention represent a class of compounds which of themselves have utility as high temperature lubricants and in turn may be used as the basic ingredient to formulate high temperature lubricating compositions having a tremendously wide variety of properties and applications. Furthermore, the properties of such compositions may be varied further by the addition of various lubricating oil additives, such as pour point depressants, detergents, corrosion inhibitors, stabilizers, viscosity index improvers, and the like, used in conventional lubricating oils. In fact, mixtures of conventional hydrocarbon lubricating oils and the monoalkyl dinaphthyl phosphate esters of this invention may be prepared resulting in compositions exhibiting the desirable properties of both ingredients. Thus, the phosphate esters of this invention may be mixed with suitable lubricating oils to reduce the flammability characteristics of the oil without deleteriously affecting its lubricity, stability or viscosity.

2-methylpentyl di(β-naphthyl) phosphate 2-methylpentyl phosphoryl dichloride was prepared by adding 102.1 g. of 2-methyl-1-pentanol, cooled to 10° C., to 153.4 g. of phosphorus oxychloride cooled to 10° C. with stirring and cooling and at a rate so as to maintain a reaction temperature of 10 to 15° C. After all of the 2-methyl-1-pentanol had been added to the phosphorus oxychloride, the reaction was carried to completion to form 2-methylpentyl phosphoryl dichloride in the same manner as was described for the preparation of 6-methylheptyl phosphoryl dichloride.

The 2-methylpentyl phosphoryl dichloride was reacted with an aqueous sodium β-naphtholate solution cooled to about 5° C. and prepared by adding 302.6 g. of β-naphthol to an alkaline solution of 1,200 ml. of water and 172.3 g. of 48.7% sodium hydroxide, at such a rate as to maintain a reaction temperature of about 5° C. After all of the 2-methylpentyl phosphoryl dichloride had been added to the sodium β-naphtholate solution, the cooling means were removed and the reaction temperature allowed to rise to about 25° C. Thereafter the reaction was carried to completion by continuous agitation for about one and one-half hours. The 2-methylpentyl di(β-naphthyl) phosphate was then recovered in the manner described for the preparation of 6-methylheptyl di(α-naphthyl) phosphate.

*6-methylheptyl di(beta-naphthyl) phosphate*

76.7 g. of POCl₃ was cooled with stirring to about 10° C. in a glass lined closed reaction vessel. 65.1 g. of 6-methyl-1-heptanol was cooled to about 10° C. and added to the POCl₃ with continuous stirring and at a rate so as to maintain a reaction temperature of 10° to 14° C. The reaction mixture was continuously agitated and the temperature gradually increased to 25° C. over a period of about one hour. While the stirring was continued the reaction mixture was placed under a vacuum (below 50 mm. Hg) for another 1-1½ hours to remove the hydrogen chloride gas which was evolved from the reaction. The reaction mixture then contained predominantly 6-methylheptyl phosphoryl dichloride.

An aqueous solution of sodium beta-naphtholate, prepared by adding 151.3 g. of beta-naphthol to an alkaline solution of 500 ml. of water and 86.1 g. of 48.7% sodium hydroxide, was cooled and the 6-methylheptyl phosphoryl dichloride added to the sodium naphtholate solution over a period of about three hours and at such a rate as to maintain a reaction temperature of from 21°-22° C. The reaction mixture was further stirred for another six hours maintaining alkaline conditions by the addition of an additional 8.7 g. of 48.7% sodium hydroxide.

The mixture was then allowed to stand until an ester layer and an aqueous layer formed and the crude ester layer was then separated from the aqueous layer. The crude ester was given successive washes with 2% NaOH solution and water thereby removing the unreacted beta-naphthol and partial esters, and reducing the alkalinity of the mass until is was acid to phenolphthalein, and then dehydrated under vacuum at about 100° C. The yield, based on POCl₃, was 79.8%.

The 6-methylheptyl di(beta-naphthyl) phosphate prepared in the above manner had the following properties:

Color and appearance__ Dark brown oily liquid.
Sp. gr. 25/25° C. _____ 1.1407.
$N_D^{25}$ _____ 1.5820.
Phosphorus—
    Calculated for: $C_{28}H_{31}O_4P$ _____ 6.71%
    Found _____ 6.41%

*2-ethylhexyl di(β-naphthyl) phosphate*

153.4 g. of POCl₃ was cooled with stirring to about 10° C. in a glass lined closed reaction vessel. 130.2 g. of 2-ethylhexanol was cooled to about 10° C. and added to the POCl₃ with continuous stirring and at a rate so as to maintain a reaction temperature of 10° to 14° C. The reaction mixture was continuously agitated and the temperature gradually increased to 25° C. over a period of about one hour. While the stirring was continued the reaction mixture was placed under a vacuum (below 50 mm.) for another two hours to remove the hydrogen chloride gas which was evolved from the reaction. The reaction mixture then contained predominantly 2-ethylhexyl phosphoryl dichloride.

An aqueous solution of sodium β-naphtholate, prepared by adding 302.6 g. of β-naphthol to an alakline solution of 1,130 ml. of H₂O and 172.2 g. of 48.7% sodium hydroxide, was cooled and the 2-ethylhexyl phosphoryl dichloride added to the sodium naphtholate over a period of about four hours and at such a rate as to maintain a reaction temperature of from 0-3° C. The reaction mixture was further stirred for another three hours maintaining alkaline conditions by the addition of a small amount of a 48.7% sodium hydroxide solution.

The mixture was then allowed to stand until an ester layer and an aqueous layer formed and the crude ester layer was then separated from the aqueous layer. The crude ester was given successive washes with 2% NaOH solution and water thereby removing the unreacted β-naphthol and partial esters and reducing the alkalinity of the mass until it was acid to phenolphthalein, and then dehydrated under vacuum at about 100° C. The yield, based on POCl₃, was 80.7%.

The 2-ethylhexyl di(β-naphthyl) phosphate prepared in the above manner had the following properties:

Color and appearance__ Dark brown oily liquid.
Sp. gr. 25/25° C. _____ 1.1415.
$N_D^{25}$ _____ 1.5821.
Viscosity:
    100° F. _____ 167.3 centistokes.
    210° F. _____ 9.26 centistokes.
Pour point _____ +5° F.

*Nonyl di(β-naphthyl) phosphate*

230.1 g. of POCl₃ was cooled with stirring to about 10° C. in a glass lined closed reaction vessel. To this POCl₃ was added 216.4 g. of nonyl alcohol (a trimethyl substituted primary hexanol) with continuous stirring and at such a rate so as to maintain a reaction temperature below 15° C. After all of the alcohol had been added, a vacuum (below 50 mm. Hg) was applied to remove the hydrogen chloride formed during the reaction. The product of this reaction was substantially pure nonyl phosphoryl dichloride.

The nonyl phosphoryl dichloride was then added, over a period of four hours, to a 23% aqueous sodium β-naphtholate solution containing 522.9 g. of sodium β-naphtholate. During this reaction the temperature was maintained at about 25° C. After all the nonyl phosphoryl dichloride had been added, the reaction was taken to completion by stirring for an additional six hours after which time the mixture was allowed to stand and separate into an aqueous layer and an ester layer. The ester layer was separated and given successive washes with 2% NaOH and water and then further refined in accordance with the usual procedures well known to those skilled in the art of refining phosphate esters, thereby recovering substantially pure nonyl di(β-naphthyl) phosphate.

*2-n-propylheptyl di(α-naphthyl) phosphate*

2-n-propylheptyl phosphoryl dichloride was prepared by reacting 158.3 g. of 2-n-propyl-1-heptanol with 153.4 g. of POCl₃ in the manner described for the preparation of 2-ethylhexyl phosphoryl dichloride. This 2-n-propylheptyl phosphoryl dichloride was then added to an aqueous solution of sodium α-naphtholate, which was prepared by adding 302.6 g. of α-naphthol to an alkaline solution of 900 ml. of water and 172.2 g. of 48.7% sodium hydroxide, over a period of three hours and at such a rate as to maintain a reaction temperature in the range of 21° to 24° C. The reaction was then taken to completion, and the ester recovered and purified in the manner described in the preparation of 2-ethylhexyl di(β-naphthyl) phosphate, thereby obtaining in good yield substantially pure 2-n-propylheptyl di(α-naphthyl) phosphate.

Dodecyl di(β-naphthyl) phosphate 372.6 g. of a 12-carbon branched chain primary alcohol prepared from the polymerization products of olefins was cooled to about 10° C. and added to 306.8 g. of POCl₃ in a glass lined closed reaction vessel with continuous stirring and at a rate so as to maintain a reaction temperature of 10° to 15° C. The reaction mixture was continuously agitated and the temperature gradually increased to 25° C. over a period of about one hour. While the stirring was continued the reaction mixture was placed under a vacuum for another 1–1½ hours to remove the hydrogen chloride gas which was evolved from the reaction. The reaction mixture then contained predominantly dodecyl phosphoryl dichloride.

The dodecyl phosphoryl dichloride was then added over a period of about 3½ hours to an aqueous solution of sodium β-naphtholate which had been prepared by adding 605.2 g. of β-naphthol to an alkaline solution of 2,000 ml. of water and 344.4 g. of 48.7% sodium hydroxide. During this reaction the temperature was maintained in the range of 18° to 22° C. After all the dodecyl phosphoryl dichloride had been added, the reaction mixture was further stirred for an additional eight hours maintaining the reaction mass constantly alkaline by the addition of small amounts of sodium hydroxide.

The mixture was then allowed to stand until an ester layer and an aqueous layer formed. The crude ester was separated and given successive washes with 2% NaOH and water to remove the unreacted β-naphthol and partial esters, and reducing the alkalinity of the mass until it was acid to phenolphthalein. The ester was then dehydrated under vacuum at about 100° C., thereby obtaining in excellent yield and purity dodecyl di(β-naphthyl) phosphate.

Tridecyl di(α-naphthyl) phosphate 337.5 g. of POCl₃ was cooled to about 10° C. with stirring in a glass lined closed reaction vessel. To this POCl₃ was added 440.8 g. of a 13-carbon branched chain primary alcohol derived from the polymerization products of olefins. This alcohol was added with cooling and at such a rate as to maintain a reaction temperature below 15° C. After all the alcohol had been added, the hydrogen chloride formed in the reaction was removed under vacuum.

The substantially pure tridecyl phosphoryl dichloride thus formed was then added over a period of six hours to a 23% aqueous sodium α-naphtholate solution containing 767.8 g. of sodium α-naphtholate. During this addition period, the temperature was maintained in the range of 20° to 25° C. After all the tridecyl phosphoryl dichloride had been added, the reaction was taken to completion by an additional six hour stirring period at room temperature. The mixture was then allowed to stand and it readily separated into an aqueous layer and an ester layer. The ester layer was given successive washes with 2% NaOH and water and then further refined in accordance with the usual procedures well known to those skilled in the art of refining phosphate esters. Substantially pure tridecyl di(α-naphthyl) phosphate was obtained in good yield.

Tetradecyl di(α-naphthyl) phosphate

Tetradecyl phosphoryl dichloride was prepared by reacting 107.2 g. of a 14-carbon branched chain primary alcohol, prepared from the polymerization products of olefins, with 76.7 g. of POCl₃ in the manner described for the preparation of dodecyl phosphoryl dichloride. This tetradecyl phosphoryl dichloride was then added to 758 g. of a 23% sodium α-naphtholate solution at a temperature of 10° C. and the reaction carried to completion, the ester recovered and purified in the manner as described for the preparation of dodecyl di(β-naphthyl) phosphate thereby obtaining in excellent yield and purity tetradecyl di(α-naphthyl) phosphate.

Hexadecyl di(β-naphthyl) phosphate

Hexadecyl phosphoryl dichloride was prepared by adding 121.2 g. of a 16-carbon branched chain primary alcohol, prepared from the polymerization products of olefins, to 76.7 g. of POCl₃, cooled to 10° C., with continuous stirring and cooling and at such a rate as to maintain a reaction temperature of 10° to 15° C. The reaction mixture was held at 15° C. for one hour following the addition of the hexa-1-decanol and thereafter the reaction temperature was raised to 25° C. and the reaction thereafter continuously stirred and held under 30 mm. Hg. vacuum (to remove the HCl evolved) for an additional hour to complete the formation of the hexadecyl phosphoryl dichloride.

The hexadecyl phosphoryl dichloride was reacted with an aqueous sodium β-naphtholate solution cooled to 20° C. and prepared by adding 151.3 g. of β-naphthol to 550 ml. of water having dissolved therein 86.1 g. of 48.7% soda lye. The hexadecyl phosphoryl dichloride was added at such a rate so as to maintain a reaction temperature of about 20° C. and after all of the hexadecyl phosphoryl dichloride had been added, the reaction was finished off and the ester recovered and purified in the manner described for the preparation of dodecyl di(β-naphthyl) phosphate. The hexadecyl di(β-naphthyl) phosphate was obtained in excellent yield and purity.

Octadecyl di(α-naphthyl) phosphate

The octadecyl alcohol used in this example was 2-(1,3,3,-trimethylbutyl)-5,7,7-trimethyl-1-octanol prepared from the polymerization products of olefins.

76.7 g. of POCl₃ was cooled with stirring to about 25° C. in a glass lined closed reaction vessel. 135.5 g. of the above described octadecyl alcohol was cooled and added to the POCl₃ at a rate so as to maintain a reaction temperature of about 25° C. The reaction mixture was continuously agitated and the temperature allowed to rise to room temperature and maintained at this temperature for an additional one hour stirring period, during which time the hydrogen chloride gas, evolved during the reaction, was removed by means of applying a vacuum to the reaction vessel.

The octadecyl phosphoryl dichloride was then transferred to a reactor containing 760 g. of a 23% sodium α-naphtholate solution. The octadecyl phosphoryl dichloride was added at such a rate so as to maintain a temperature below 30° C. After all the octadecyl phosphoryl dichloride had been added, the reaction mixture was stirred for an additional three hours allowing the mixture to come to room temperature. On standing, the reaction mixture separated into an aqueous layer and an ester layer. The ester layer was removed and given successive washes with a 2% sodium hydroxide solution and water, and finally dehydrated under vacuum at about 110° C., thereby obtaining in excellent yield and purity, octadecyl di(α-naphthyl) phosphate.

*Butoxyethyl di(β-naphthyl) phosphate*

153.4 g. of POCl₃ was cooled with stirring to about 15° C. in a glass lined closed reaction vessel. 118 g. of anhydrous ethylene glycol monobutyl ether which had been cooled to approximately 15° C. was added to the POCl₃ with continuous stirring and at a rate so as to maintain a reaction temperature of about 15° C. The reaction mixture was agitated, and by means of continuous stirring, the reaction temperature of 15° C. maintained for one hour following the addition of all of the ethylene glycol monobutyl ether. Thereafter, the temperature was allowed to rise to about 25° C. and the stirring continued for another hour while the hydrogen chloride gas which was evolved from the reaction was continuously removed by means of applying a vacuum to the reaction vessel. The reaction product was butoxyethyl phosphoryl dichloride.

A sodium β-naphtholate solution was prepared by adding 302.6 g. of β-naphthyl to an alkaline solution of 1,000 ml. of water and 172.2 g. of 48.7% sodium hydroxide. This solution of sodium β-naphtholate was cooled to about 3° C., and with continuous cooling 230.7 g. of the butoxyethyl phosphoryl dichloride was added to the sodium β-naphtholate solution at such a rate so as to maintain a reaction temperature below 5° C. After all of the butoxyethyl phosphoryl dichloride had been added, the reaction mixture was agitated for an additional hour and then, with continuous stirring, allowed to warm up to room temperature. The mixture was then allowed to stand until an aqueous layer and an ester layer formed, and the ester layer was then separated from the aqueous layer by decantation. The ester was given successive washes with a 2% sodium hydroxide solution and water, and then dehydrated under vacuum at about 100° C., thereby obtaining substantially pure butoxyethyl di(β-naphthyl) phosphate.

*n-Hexoxyethyl di(α-naphthyl) phosphate*

153.4 g. of POCl₃ was cooled with stirring to about 10° C. in a glass lined closed reaction vessel. 146.2 g. of ethylene glycol mono-n-hexyl ether was cooled to approximately 15° C. and added to the POCl₃ with continuous stirring and at a rate so as to maintain a reaction temperature of 20° C. The reaction mixture was agitated and the reaction temperature of 20° C. was maintained for one hour following the addition of all the ethylene glycol mono-n-hexyl ether. Thereafter the temperature was allowed to rise to about 25° C. and the stirring continued for another hour. The hydrogen chloride gas which was evolved from the reaction was continuously removed by means of applying a vacuum to the reaction vessel.

The n-hexoxyethyl phosphoryl dichloride thus formed was transferred to a reactor containing 1,514 g. of a 23% solution of sodium α-naphtholate cooled to about 18° C. The n-hexoxyethyl phosphoryl dichloride was added over a period of three hours and at such a rate as to maintain a reaction temperature between 18° and 25° C. After all the n-hexoxyethyl phosphoryl dichloride had been added, the reaction mass was stirred for an additional six hours maintaining the reaction mixture slightly alkaline by the periodic additions of small amounts of 48.7% sodium hydroxide. On standing, the reaction mixture separated into an ester layer and an aqueous layer. The crude ester layer was separated and given successive washes with a 2% NaOH solution and water, thereby removing any unreacted α-naphthol and partial esters, and reducing the alkalinity of the mass until it is acid to phenolphthalein. The ester was then dehydrated under vacuum at about 100° C., thereby obtaining in good yield and substantially pure, the n-hexoxyethyl di(α-naphthyl) phosphate.

*2-ethylhexoxyethyl di(β-naphthyl) phosphate*

One mol of 2-ethylhexoxyethyl phosphoryl dichloride was prepared in the manner described in the preparation of n-hexoxyethyl phosphoryl dichloride by reacting one mol of ethylene glycol mono-2-ethylhexyl ether with one mol of POCl₃. The 2-ethylhexoxyethyl phosphoryl dichloride thus formed was added, over a period of three hours to 23% aqueous solution of sodium β-naphtholate containing 2.1 mols of sodium β-naphtholate. During the time of this reaction, the temperature was maintained in the range of 20° to 25° C.

After all the 2-ethylhexoxyethyl phosphoryl dichloride had been added the reaction mixture was stirred for an additional six hours, adding small amounts of a 48.7% sodium hydroxide solution to maintain alkaline conditions. After the reaction was complete, the ester layer was separated from the aqueous layer and the ester purified in the manner described in the preparation of n-hexoxyethyl di(α-naphthyl) phosphate. Substantially pure 2-ethylhexoxyethyl di(β-naphthyl) phosphate was thus obtained in excellent yield.

*Nonoxyethyl di(β-naphthyl) phosphate*

460.2 g. of POCl₃ was cooled with stirring to a temperature of 5° to 10° C. in a glass lined closed reaction vessel. 564.9 g. of ethylene glycol mononoyl ether, wherein the nonyl radical is a trimethyl substituted primary hexanol, was cooled to 5° to 10° C. and added to the POCl₃ with constant stirring and at such a rate so as to maintain a reaction temperature of about 15° C. The reaction mass was then placed under a vacuum (below 50 mm. Hg) to remove the hydrogen chloride formed during the reaction.

A 23% aqueous sodium β-naphtholate solution was prepared containing 6.3 mols of sodium β-naphtholate. To this solution was added, over a period of eight hours, the nonoxyethyl phosphoryl dichloride previously prepared. During this reaction, the temperature of the mixture was maintained at about 25° C. The reaction was taken to completion by an additional eight hour stirring period after which time the reaction mixture was allowed to stand and separate into an ester layer and an aqueous layer.

The ester layer was then given successive washes with 2% NaOH and water to remove any unreacted or partially reacted materials, dried under vacuum at about 100° C., and substantially pure nonoxyethyl di($\beta$-naphthyl) phosphate recovered.

n-Dodecoxyethyl di($\beta$-naphthyl) phosphate

To 200 g. of $POCl_3$, cooled to about 20° C. in a closed and continuously cooled reactor, 300 g. of ethylene glycol mono-n-dodecyl ether was added with stirring and at a rate so as to maintain a reaction temperature of about 20° C. After all of the ethylene glycol mono-n-dodecyl ether was added, the reaction mixture was agitated and the temperature slowly raised to and maintained at 20° to 30° C. for about one hour. Thereafter the temperature was raised to 40° to 50° C. and maintained at that temperature for an additional hour while the stirring was continued and a vacuum of 25 mm. Hg absolute pressure was applied to the reactor to remove the hydrogen chloride formed during the reaction. The product of this reaction was n-dodecoxyethyl phosphoryl dichloride.

A sodium $\beta$-naphtholate solution, prepared by reacting 394 g. of $\beta$-naphthol with 1,580 g. of an aqueous caustic solution containing 109 g. of NaOH, was cooled to 20° C. and maintained at this temperature while the above prepared n-dodecoxyethyl phosphoryl dichloride was slowly added with stirring over a period of about four hours. Thereafter the stirring was continued for another six hours allowing the temperature of the reaction mixture to come to room temperature. The mixture was then allowed to separate and the ester layer separated from the aqueous layer. The crude ester layer was given successive washes with a 2% NaOH solution and water, thereby removing any unreacted $\beta$-naphthol and partial esters. The ester was then dried under vacuum at about 105° C. thereby obtaining in excellent yield and purity n-dodecoxyethyl di($\beta$-naphthyl) phosphate.

Tridecoxyethyl di($\alpha$-naphthyl) phosphate

Utilizing the procedure described in the preparation of n-dodecoxyethyl phosphoryl dichloride, tridecoxyethyl phosphoryl dichloride was prepared by reacting 122 g. of ethylene glycol monotridecyl ether, wherein the tridecyl radical was a 13-carbon branched chain primary alkyl group derived from the polymerization products of olefins, with 76.7 g. of $POCl_3$.

The tridecoxyethyl phosphoryl dichloride was added over a period of three hours, to a sodium $\alpha$-naphtholate solution containing 174.5 g. of sodium $\alpha$-naphtholate. During this reaction, the temperature was maintained in the range of 19° to 23° C. After all the tridecoxyethyl phosphoryl dichloride had been added, the reaction mixture was agitated for another six hours during which time the temperature was allowed to rise to room temperature. The reaction mass was then allowed to stand until the ester layer and aqueous layer had separated. The ester layer was recovered and the ester refined in accordance with the usual methods well known to those skilled in the art of refining phosphate esters thereby obtaining substantially pure tridecoxyethyl di($\alpha$-naphthyl) phosphate.

Tetradecoxyethyl di($\beta$-naphthyl) phosphate

An aqueous solution of sodium $\beta$-naphtholate was prepared by adding 302.0 g. of $\beta$-naphthol to an alkaline solution of 1,000 ml. of water and 172.0 g. of 48.7% sodium hydroxide. This solution was cooled to 20° C. and to it was added over a period of four hours, 371.0 g. of tetradecoxyethyl phosphoryl dichloride which had been prepared by the reaction of 153.4 g. of $POCl_3$ with 258.4 g. of ethylene glycol mono tetradecyl ether wherein the tetradecyl radical was a 14-carbon branched chain primary alkyl group derived from the polymerization products of olefins. The tetradecoxyethylphosphoryl dichloride was added at such a rate as to maintain a reaction temperature of from 20° to 25° C. After all the reactant had been added, the reaction mixture was stirred for an additional six hours at the end of which time the reaction was complete.

The reaction mixture was then allowed to stand permitting the ester layer and aqueous layer to separate. The crude ester was recovered and washed with 2% NaOH and water and then further refined in accordance with the usual methods well known to those skilled in the art of refining phosphate esters thereby obtaining substantially pure tetradecoxyethyl di($\beta$-naphthyl) phosphate.

n-Hexadecoxyethyl di($\alpha$-naphthyl) phosphate 76.7 g. of $POCl_3$ was cooled with stirring to about 5° C. in a glass lined closed reaction vessel and 143.2 g. of ethylene glycol mono-n-hexadecyl ether added at such a rate so as to maintain a reaction temperature below 10° C. The hydrogen chloride formed during this reaction was continuously removed under vacuum. The product of this reaction was substantially pure n-hexadecoxyethyl phosphoryl dichloride.

The n-hexadecoxyethyl phosphoryl dichloride was then added over a period of about three hours to 757 g. of a 23% aqueous sodium $\alpha$-naphtholate solution maintaining a reaction temperature between 20° and 22° C. After all the n-hexadecoxyethyl phosphoryl dichloride had been added the reaction mass was further stirred for an additional six hours at room temperature. The reaction mass was then allowed to separate into two layers and the ester layer recovered. The ester layer was given successive washes with 2% NaOH solution and water removing any partial esters and unreacted $\alpha$-naphthol. The wet ester was then dehydrated under vacuum thereby obtaining substantially pure n-hexadecoxyethyl di($\alpha$-naphthyl) phosphate in good yield.

Octadecoxyethyl di($\alpha$-naphthyl) phosphate 153.4 g. of $POCl_3$ was cooled with stirring to about 10° C. in a glass lined closed reaction vessel. 314 g. of ethylene glycol mono-n-octadecyl ether was cooled to approximately 20° C. and added to the $POCl_3$ with continuous stirring and at a rate so as to maintain a reaction temperature of about 20° C. The reaction mixture was agitated and the reaction temperature of about 20° C. maintained for one hour following the addition of all the reactants. Thereafter, the temperature was allowed to rise to about 30° C. and the stirring continued for another hour. The hydrogen chloride gas, which was evolved from the reaction, was continuously removed by means of applying a vacuum to the reaction vessel.

The octadecoxyethyl phosphoryl dichloride thus formed was transferred to a reactor containing 1,520 g. of a 23% solution of sodium $\alpha$-naphtholate cooled to about 20° C. The octadecoxyethyl phosphoryl dichloride was added over a period of four hours and at such a rate so as to maintain a reaction temperature of about 25° C. After all the octadecoxyethyl phosphoryl dichloride had been added, the reaction mass was stirred for an additional five hours, maintaining the reaction mixture slightly alkaline by the periodical addition of small amounts of a sodium hydroxide solution. The crude ester layer, which separated on standing, was recovered and given successive washes with a dilute sodium hydroxide solution and water and then dehydrated under vacuum at about 110° C., thereby obtaining substantially pure octadecoxyethyl di(α-naphthyl) phosphate.

What is claimed is:

1. As new chemical compounds, the monoalkyl dinaphthyl phosphate esters of the type

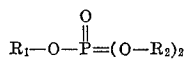

wherein $R_1$ represents an alkyl radical selected from the group consisting of alkyl radicals terminating with a $CH_2$ group and containing at least 6 and not more than 18 carbon atoms and beta-alkoxyethyl radicals wherein the alkyl substituent contains at least 4 and not more than 18 carbon atoms and $R_2$ is a naphthyl radical.

2. As new chemical compounds, the monoalkyl dinaphthyl phosphate esters wherein the alkyl radical is an alkyl radical terminating with a $CH_2$ group and containing at least 6 and not more than 18 carbon atoms.

3. As new chemical compounds, the monoalkyl dinaphthyl phosphate esters wherein the alkyl radical is an alkyl radical terminating with a $CH_2$ group and containing 8 carbon atoms.

4. As new chemical compounds, the 6-methylheptyl dinaphthyl phosphates.

5. As a new chemical compound, 6-methylheptyl di(beta-naphthyl) phosphate.

6. As new chemical compounds, the 2-ethylhexyl di-naphthyl phosphates.

7. As a new chemical compound, 2-ethylhexyl di-(beta-naphthyl) phosphate.

8. As new chemical compounds, the monoalkoxyethyl dinaphthyl phosphate esters of the type

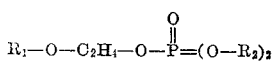

wherein $R_1$ represents an alkyl radical of at least 4 and not more than 18 carbon atoms and $R_2$ is a naphthyl radical.

HARRY R. GAMRATH.
WILLIAM E. WEESNER.

References Cited in the file of this patent

UNITED STATES PATENTS

| Number | Name | Date |
|---|---|---|
| 2,143,639 | Caprio | Jan. 10, 1939 |

OTHER REFERENCES

Plimmer et al., J. Chem. Soc. (1929), pp. 279–292.